(12) United States Patent  (10) Patent No.: US 9,330,135 B2
Lee et al.  (45) Date of Patent: May 3, 2016

(54) METHOD, APPARATUS AND COMPUTER READABLE RECORDING MEDIUM FOR A SEARCH USING EXTENSION KEYWORDS

(71) Applicant: NHN Business Platform Corporation, Seongnam-si (KR)

(72) Inventors: Ho Seok Lee, Seongnam-si (KR); Do Yung Yoon, Seongnam-si (KR)

(73) Assignee: Naver Corporation, Seongnam-si (KR)

( * ) Notice: Subject to any disclaimer, the term of this patent is extended or adjusted under 35 U.S.C. 154(b) by 153 days.

(21) Appl. No.: 13/627,762

(22) Filed: Sep. 26, 2012

(65) Prior Publication Data

US 2013/0159337 A1 Jun. 20, 2013

(30) Foreign Application Priority Data

Sep. 27, 2011 (KR) .................. 10-2011-0097523

(51) Int. Cl.
*G06F 17/30* (2006.01)
*G06Q 30/02* (2012.01)

(52) U.S. Cl.
CPC .... *G06F 17/30389* (2013.01); *G06F 17/30672* (2013.01); *G06Q 30/0256* (2013.01); *G06Q 30/0277* (2013.01)

(58) Field of Classification Search
USPC ....................................... 707/708
See application file for complete search history.

(56) References Cited

U.S. PATENT DOCUMENTS

| 8,443,008 | B2* | 5/2013 | Tsuchida et al. ............... 707/803 |
| 8,700,599 | B2* | 4/2014 | Udupa et al. .................. 707/709 |
| 2008/0010275 | A1* | 1/2008 | Lee et al. ..................... 707/5 |
| 2010/0070506 | A1* | 3/2010 | Whang ............. G06F 17/30678 707/740 |
| 2010/0262994 | A1* | 10/2010 | Kawano et al. ................. 725/39 |
| 2010/0293184 | A1* | 11/2010 | Josifovski et al. ............ 707/769 |

FOREIGN PATENT DOCUMENTS

| JP | 11-045274 | 2/1999 |
| JP | 2005-251038 | 9/2005 |
| KR | 10-2010-0025731 | 3/2010 |

OTHER PUBLICATIONS

Office Action issued in corresponding Japanese patent application No. 2012-209596, dated Feb. 23, 2016.

\* cited by examiner

*Primary Examiner* — Hung Q Pham
(74) *Attorney, Agent, or Firm* — Greer Burns & Crain, Ltd.

(57) ABSTRACT

Disclosed herein are a method, an apparatus, and a computer readable recording medium for a search using extension keyword. According to an aspect of the present invention, there is provided a method for a search using extension keyword, the method including mapping search keywords transmitted from a user terminal to at least one concept keyword, extending the concept keyword to plurality of concept keywords having association with each other so that a concept keyword extension data-set is generated, and generating extension keywords corresponding to the concept keyword extension data-set.

16 Claims, 9 Drawing Sheets

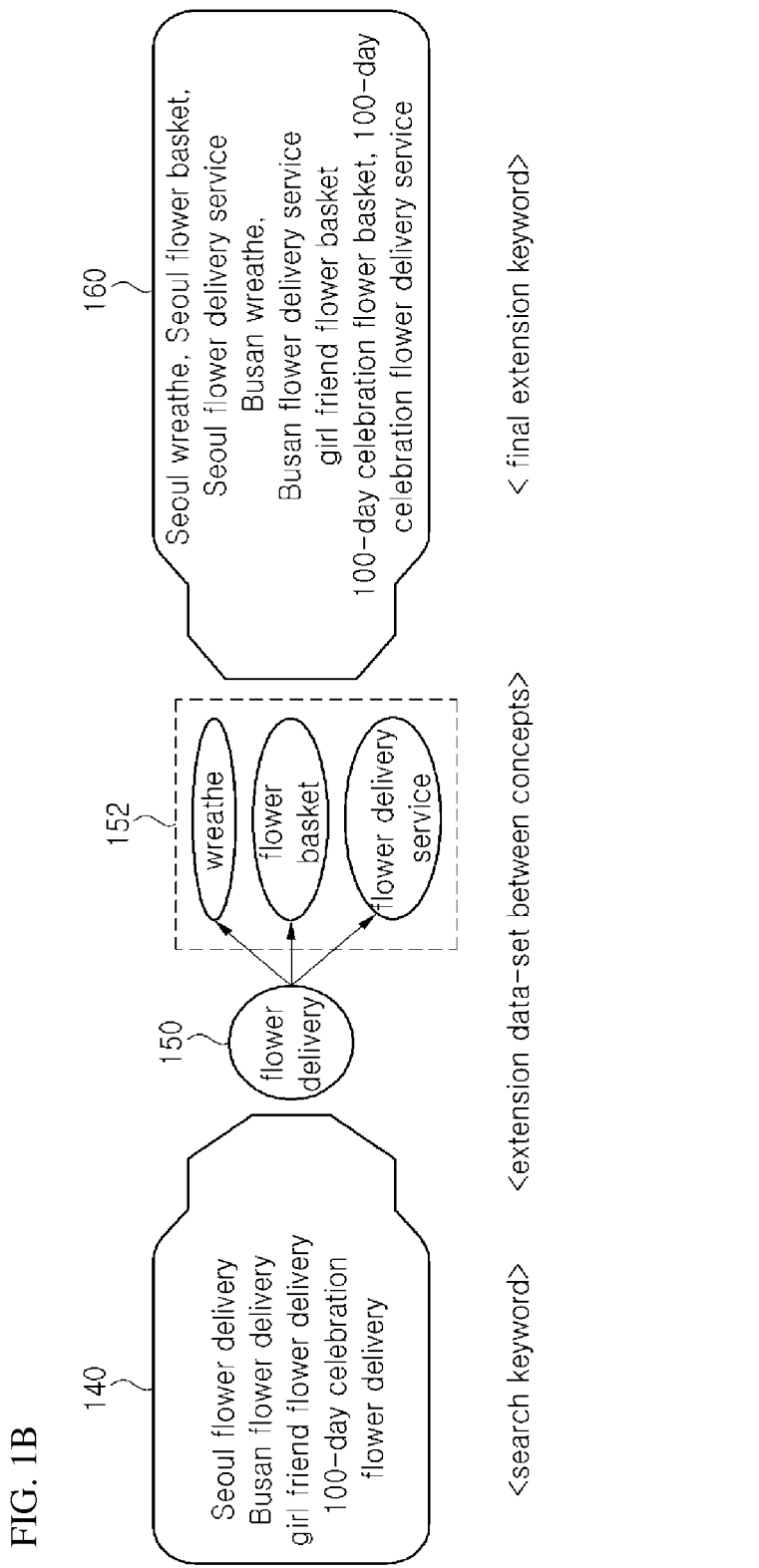

METHOD, APPARATUS AND COMPUTER READABLE RECORDING MEDIUM FOR A SEARCH USING EXTENSION KEYWORDS

CROSS-REFERENCE TO RELATED APPLICATIONS

This application claims priority from and the benefit of Korean Patent Application No. 10-2011-0097523, filed on Sep. 27, 2011, which is hereby incorporated by reference for all purposes as if fully set forth herein.

BACKGROUND OF THE INVENTION

1. Field of the Invention

The present invention relates to a method, an apparatus, and a computer readable recording medium for a search using extension keywords, and more particularly, to a method, an apparatus, and a computer readable recording medium for a search using extension keywords capable of performing search services and/or keyword advertisement by dividing and extracting modifiers and concept keywords, respectively, from keywords and using a concept keyword extension data-set that is a set of the concept keywords having association with each other according to association among the extracted concept keywords.

2. Discussion of the Background

With the wide spread of the Internet, a search using the Internet has been generalized. Recently, the Internet search has been more popularized with the development of mobile devices. Generally, a user accesses a search server by operating information communication devices and then, inputs search keywords for information that he/she wants to search to a search window to perform the Internet search. In case of the search service according to the related art, matched search results are determined based on the search keywords input by the user, such that only the search results matched with the search keywords input by the user may be provided to the user. In order to solve the above problem, a technology for searching/providing search results matched with the same or like search keywords by extending the search keywords input by the user has been developed. However, the extension of the search keywords is performed on all the morphemes configuring the search keywords, such that inappropriate search results may be provided when the search keywords are configured of modifiers and concept keywords.

With the spread of the Internet, importance of advertisement using the Internet has been gradually increased and types of advertisement using the Internet have been continuously developed.

Among the advertisements used on the Internet, there may be banner advertisement as the most classical type, which is a method of inserting advertisement such as a banner type of texts, a picture or moving picture type of advertisement into so-called advertising areas that is specific areas of sites frequently visited by users, such as portal sites, news sites, and the like. In case of the banner advertisement, when the user takes actions such as click or mouse over on the corresponding banner advertisement, and the like, the corresponding banner advertisement is activated to provide the detailed contents thereof or is linked to a web site corresponding thereto, thereby obtaining the advertising effect.

However, the type of the banner advertisement unilaterally provides the advertisement independent of the user's taste, preference, interest, and the like, to degrade the advertising effect. Meanwhile, when various colors are used for the banner advertisement, in particular, a plurality of banner advertisements are inserted into a limited space of the site, the coherence thereof is not maintained and the advertisements seem to be complex, such that the beauty of the corresponding site may be damaged.

Among advertisement models used on the Internet, the keyword advertisement has been in the limelight as a new type. The keyword advertisement provides the advertisements matched with the input search keywords to a specific area in an area providing the search results in a banner type, based on the expectation that the interest in products or services matched with the search keywords input by the user is more increased in the portal sites, and the like, providing the search results, and the like. In case of the keyword advertisement, the advertising effect can be obtained by a method of providing the keyword advertisement together with the detailed contents of advertisement so as to be exposed to the user and providing the detailed advertisement contents by actions such as the user's click or the mouse over, and the like, or linking the keyword advertisement to web sites corresponding thereto.

In the keyword advertisement, the matched advertisements are determined based on the search keywords input by the user, such that only the advertisements matched with the keywords input by the user may be exposed. In order to solve the above problem, a technology for searching/exposing the advertisements matched with the same or like search keywords by extending the search keywords input by the user has been developed. Korean Patent Laid-Open Publication No. 10-2010-0025731 (Search Method And System Using Extended Keyword Pool, laid-open published on Mar. 10, 2010) discloses a system and a method for a search using an extension keyword pool capable of providing keywords within a wider range by further including a set of keywords in which other keywords and hit numbers for each keyword are generated over a certain number, in addition to a set of keywords having a search advertisement purchase history, to generate a keyword pool.

That is, generally describing characteristics of the advertiser purchase advertising keywords requesting the search advertisements, the advertising keywords (concept) are configured of concept keywords indicating goods or services to be advertised and modifiers (an area name, a country name, a road name, a station name, adjective (cheap, inexpensive, pretty, rapid, . . . ), other modifiers (age group, grade, . . . )) for modifying the concept keywords. In the case of the advertising keywords configured of the concept keywords and the modifiers, quality of portions of modifiers may be degraded at the time of extension to all the keywords including modifiers. That is, when the extension to the modifiers is performed, the advertiser and user desired information cannot typically be accurately provided. For example, when the advertiser providing a flower deliver service in a Seoul area purchases an advertising keyword 'Seoul flower delivery', the extension to modifiers is performed, such that the 'Seoul flower delivery' can be extended to 'Busan flower delivery', 'Jeju flower delivery', and the like. In this case, inaccurate search advertisement is provided to a user and an advertiser exposes its own advertisement to a user that is not targeted, such that the advertising effect cannot be obtained and unnecessary advertising expenses may be consumed.

In order to solve the above problems, technologies for dividing the concept keywords and the modifiers from the advertising keywords are required. However, the related art cannot provide the technologies. Further, according to the related art, there are problems in that the meaningful concept keywords for the plurality of advertising keywords need to be selected and the extension data-set among the concept keywords having association with each other cannot be provided. In addition, according to the related art, the meaningful extension of the search keywords and the provision of the search advertisements using the same cannot be implemented due to the foregoing problems.

SUMMARY OF THE INVENTION

Exemplary embodiments of the present invention have been proposed to solve the problems of the related art as described above.

Exemplary embodiments of the present invention provide a method and an apparatus for a search using extension keywords generated by dividing modifiers and concept keywords from keywords and extracting the modifiers and the concept keywords, respectively.

Exemplary embodiments of the present invention provide a method and an apparatus for a search using a concept keyword extension data-set capable of searching/exposing search results and/or keyword advertisements matched to final extension keywords by mapping search keywords input by a user to concept keywords to divide modifiers, extending concept keywords using the extension data-set of the concept keywords mapped to the search keywords, and adding the modifiers to the plurality of extended concept keywords to generate final extension keywords.

As described above, a characteristic configuration of present invention is as follows for achieving the above objects of the present invention and specific effects of the present invention.

According to an exemplary embodiment of the present invention, there is provided a method for a search using extension keywords, including mapping search keywords transmitted from a user terminal to at least one concept keyword, extending the concept keyword to plurality of concept keywords having association with each other so that a concept keyword extension data-set is generated, and generating extension keywords corresponding to the concept keyword extension data-set.

According to another exemplary embodiment of the present invention, there is provided an apparatus for a search using extension keywords including a concept-keyword mapper configured to map search keywords transmitted from a user terminal to at least one concept keyword, a concept keyword extender configured to extend the concept keyword to plurality of concept keywords having association with each other so that a concept keyword extension data-set is generated, and a extension keyword generator configured to generate extension keywords corresponding to the concept keyword extension data-set, wherein the concept keyword extension data-set comprises association information between the plurality of concept keywords.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 1B is a conceptual diagram for describing generation of a concept keyword extension data-set and an advertising method using the same according to an exemplary embodiment of the present invention.

DETAILED DESCRIPTION OF THE ILLUSTRATED EMBODIMENTS

Figure 1A:
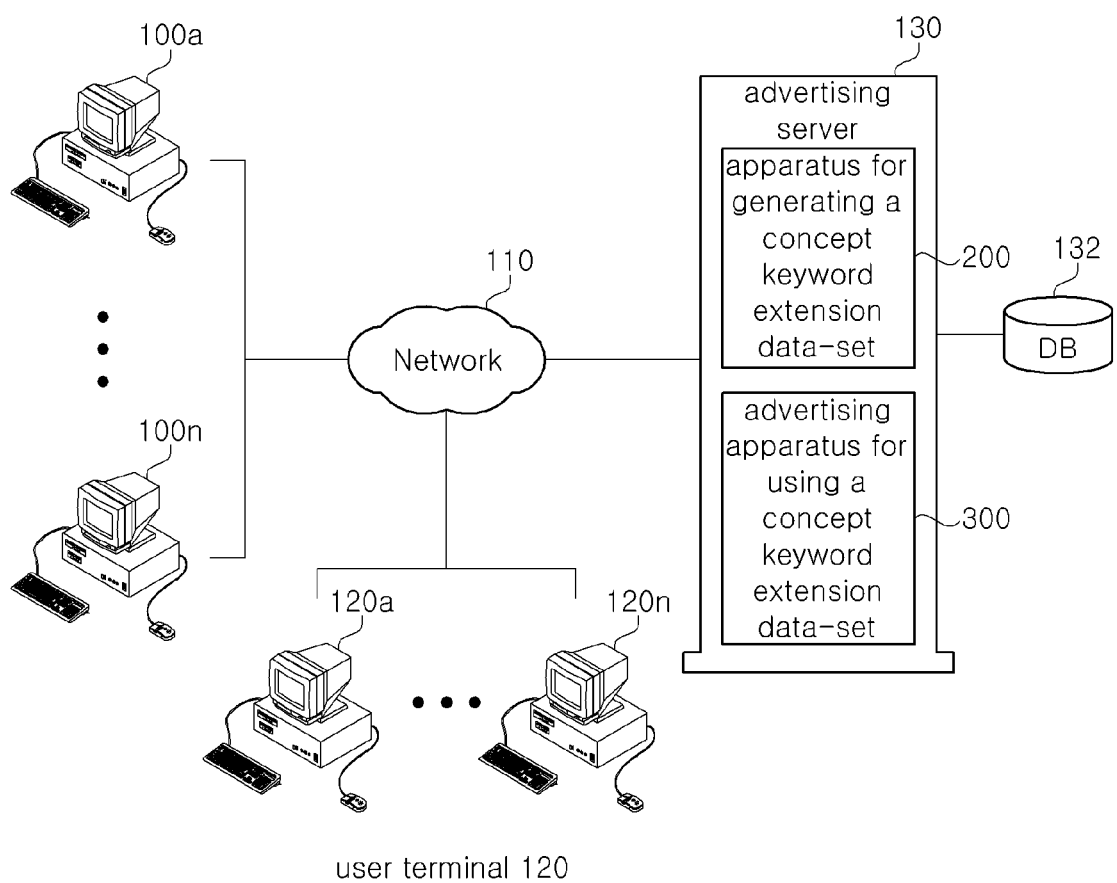
FIG. 1A is a configuration block diagram of an overall system including an apparatus for generating a concept keyword extension data-set and an advertising apparatus using a concept keyword extension data-set according to an exemplary embodiment of the present invention of the present invention.

Exemplary embodiments of the present invention will be described in detail with reference to the accompanying drawings. These embodiments will be described in detail for those skilled in the art in order to practice the present invention. It should be appreciated that various embodiments of the present invention are different but do not have to be exclusive. For example, specific shapes, configurations, and characteristics described in an embodiment of the present invention may be implemented in another embodiment without departing from the spirit and the scope of the present invention. In addition, it should be understood that position and arrangement of individual components in each disclosed embodiment may be changed without departing from the spirit and the scope of the present invention. Therefore, a detailed description described below should not be construed as being restrictive. In addition, the scope of the present invention is defined only by the accompanying claims and their equivalents if appropriate. Similar reference numerals will be used to describe the same or similar functions throughout the accompanying drawing.

Hereinafter, exemplary embodiments of the present invention will be described in detail with reference to the accompanying drawings so that those skilled in the art may easily practice the present invention.

In exemplary embodiments of the present invention, the term "keyword" means a word or words that can be used for all the types of services using words such as a search service, a keyword advertising service, and the like. Hereinafter, for convenience of explanation, exemplary embodiments for applying to the internet keyword advertising service may be mainly described, but are not limited thereto. Exemplarily, according to the exemplary embodiments of the present invention, the term "keyword" may mean an internet advertising keyword purchased by an advertiser to expose keyword advertisement. Hereinafter, for convenience of explanation, the exemplary embodiments of the present invention are described below in detail based on an advertising apparatus that can be applied to keyword advertisement, but as described above, can be applied to all the types of search services and belong to the scope of the present invention as far as they include the gist of the present invention.

Further, the term "keyword group", which is at least one set of keywords classified by predetermined references, may be, for example, a set of keywords that are grouped and managed into a single group according to the setting of an advertiser or may be a set of keywords that are classified and grouped according to a type of goods group (service group), but is not limited thereto.

In addition, the term "token" means a morpheme configuring keywords and the term "main token" means a morpheme set by being determined as having high importance according to importance within keyword groups among the plurality of tokens.

Further, the term "concept keyword" means a concept indicating goods or services among keywords.

FIG. 1A is a configuration block diagram of an overall system including an apparatus for generating a concept keyword extension data-set and an advertising apparatus using a concept keyword extension data-set according to an exemplary embodiment of the present invention. Hereinafter, an overall system according to an exemplary embodiment of the present invention will be described with reference to FIG. 1A.

As shown in FIG. 1A, an overall system according to an exemplary embodiment of the present invention may include an advertiser terminal 100, a user terminal 120, and an advertising server 130. These components may be connected to each other via network 110.

The advertiser terminal 100 performs a function of accessing the advertising server 130 through the network 110 according to an operation of an advertiser to purchase specific advertising keywords and apply keyword advertisement and managing the purchased advertising keywords.

The user terminal 120 performs a function of accessing the search server (not shown) through the network 110 to transmit the search keywords input according to the operation of the user to the search server and receiving and outputting search results (including advertising information according to search keyword matching) transmitted from the search server.

As described above, any digital device having operation capability by including a memory and a microprocessor, such as mobile communication terminals that include a desk top computer, a notebook computer, a workstation, a palmtop computer, a personal digital assistant (PDA), a web pad, and a smart phone may be adopted as the advertiser terminal 100 and the user terminal 120 according to the exemplary embodiments of the present invention.

In addition, as described above, the advertiser terminal 100 and the user terminal 120 are configured to perform the same function as the advertiser terminal 100 and the user terminal 120 configuring the general keyword advertising system and therefore, the detailed description thereof will be omitted herein.

According to the exemplary embodiment of the present invention, the network 110 may be configured independent of communication aspects such as a wired type, a wireless type, and the like, and may be configured of various communication networks, such as a personal area network (PAN), a local area network (LAN), a metropolitan area network (MAN), a wide area network (WAN), and the like. Thus, any network or networks that can be utilized for communication between advertiser terminal 100, user terminal 120, and advertising server 130 can be utilized as network 110.

Finally, the advertising server 130 according to the exemplary embodiment of the present invention performs a function of providing an advertiser page to the advertiser terminal 100 to sell advertising keywords for keyword advertisement and setting/managing advertising keywords purchased by a specific advertiser according to setting information transmitted from the advertiser terminal 100. The advertising server 130 is connected with a database 132 in which advertising information is stored and performs a function of interworking with the search server to extract the advertising information matched with the search keywords transmitted from the user terminal 120 from the database 132 and providing the extracted advertising information to the user terminal 120. Hereinafter, the exemplary embodiment of the present invention in which the search server and the advertising server are implemented in a single server is mainly described. However, one or both of the search server and advertising server can be implemented as one or more servers. Herein, the keyword advertising function is similar to a function of the already known keyword advertising server and therefore, the detailed description thereof will be omitted. Hereinafter, the creative configuration of the advertising server 130 according to the exemplary embodiment of the present invention will be mainly described.

The advertising server 130 according to the exemplary embodiment of the present invention may include an apparatus 200 for generating a concept keyword extension data-set and an advertising apparatus 300 using an extension data-set to perform two creative functions at large. The advertising server 130 according to the exemplary embodiment of the present invention serve to generate concept keywords from the same grouped keyword groups according to predetermined references using the apparatus 200 for generating a concept keyword extension data-set and set the generated concept keywords as the concept keyword extension data-set. The detailed configuration and function of the apparatus 200 for generating a concept keyword extension data-set will be described with reference to FIG. 2A.

Further, the advertising server 130 according to the exemplary embodiment of the present invention performs a function using the advertising apparatus 300 using the concept keyword extension data-set to determine the concept keywords among the search keywords transmitted from the user terminal 120 and finally extending the search keywords using the extension data-set of the determined concept keywords to extract suitable advertisements more suitable for user's intention and providing the extracted advertisements to the user terminal 120. The detailed configuration and function of the advertising apparatus 300 for using a concept keyword extension data-set will be described with reference to FIG. 2B.

According to the exemplary embodiment of the present invention shown in FIG. 1A, both of the apparatus 200 for generating a concept keyword extension data-set and the advertising apparatus 300 for using a concept keyword extension data-set are included in the advertising server 130, which is only an example. Therefore, according to the configuration of the exemplary embodiment of the present invention, it is apparent to those skilled in the art that the advertising server 130 may also be configured to include the advertising apparatus 300 for using the generated concept keyword extension data-set information and the extension data-set or the apparatus 200 for generating a concept keyword extension data-set and the advertising apparatus 300 for using a concept keyword extension data-set may be separately configured from the advertising server 130. Hereinafter, for convenience of explanation, it is to be noted that the exemplary embodiment in which the advertising server 130 includes the apparatus 200 for generating a concept keyword extension data-set and the advertising apparatus 300 for using a concept keyword extension data-set is mainly described, but is not limited thereto.

On the other hand, as described above, when the exemplary embodiment of the present invention is applied to the search service, the search server similarly configured to the foregoing advertising server 130 performs a function of generating the concept keyword extension data-set and a function of extending search keywords, searching search results using the same, and providing the searched results while performing a search service function.

FIG. 1B is a conceptual diagram for describing generation of a concept keyword extension data-set and an advertising method using the same according to an exemplary embodiment of the present invention. A method for generating a concept keyword extension data-set and an advertising method using the same according to the exemplary embodiment of the present invention will be schematically described with reference to FIG. 1B.

First, as described above, the advertising server 130 according to the exemplary embodiment of the present invention performs a function of generating/storing a concept keyword extension data-set. As shown in FIG. 1B, the advertising server 130 sets and stores an extension data-set 152 for specific keyword groups as 'wreath, flower basket, flower delivery service'. When the user operates the user terminal 120 to transmit the search keywords (any one 140 of Seoul flower delivery, Busan flower delivery, girl friend flower delivery, and 100-day celebration flower delivery) to the advertising server 130 in the state in which the extension data-set 152 is stored in the advertising server 130, the advertising server 130 maps the received search keywords to one of the concept keywords included in the extension data-set (in the exemplary embodiment shown, mapped to the flower delivery 150) and extends the concept keywords to the concept keyword extension data-set 152. In the exemplary embodiment shown, it can be confirmed that the 'flower delivery' is extended to 'wreath, flower basket, flower delivery service'. When the extension of the concept keywords to the concept keyword extension data-set 152 ends, the advertising server 130 combines a portion (in the case of the exemplary embodiment shown, 'Seoul', 'Busan', 'girl friend', '100-day celebration', and the like) determined as 'modifier' with the extended concept keywords according to the mapping of the search keywords and the concept keywords to generate the final extension keywords 160. In the exemplary embodiment shown in FIG. 1B, it can be confirmed that the final extension keyword 160 is extended to "Seoul wreathe, Seoul flower basket, Seoul flower delivery service' to generate the final extension keywords 160 when the user inputs the 'Seoul flower delivery' as the search keyword.

The advertising server 130 according to the exemplary embodiment of the present invention performs the process as described above to differentiate the modifiers and the concept keywords among the advertising keywords and extend the concept keywords according to the association of the concept keywords and again combines the extended concept keywords with modifiers to generate final extension keywords, thereby searching advertisements matched with the advertiser and user's intention and providing the searched advertisements to the user.

Figure 2A:
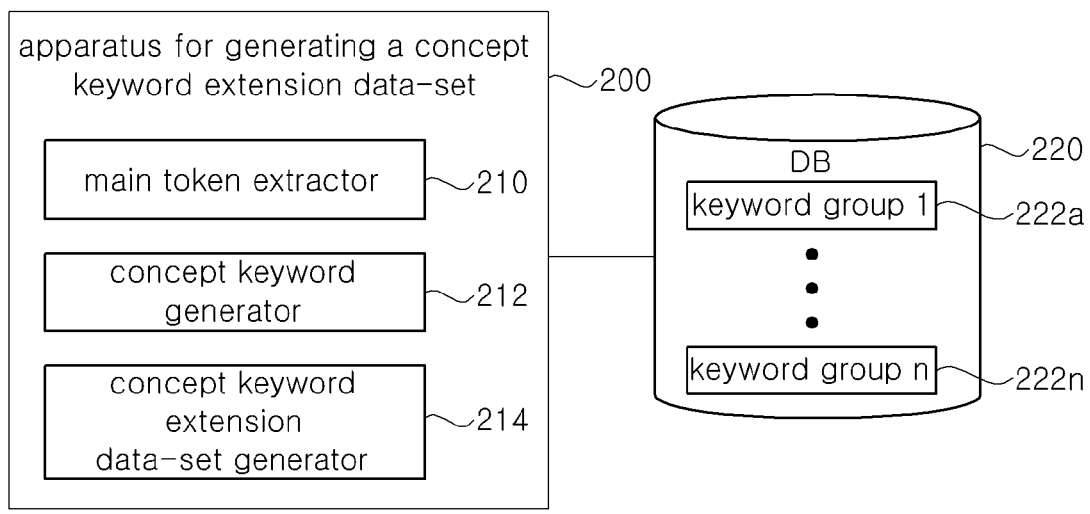
FIG. 2A is a configuration block diagram of an apparatus for generating a concept keyword extension data-set according to an exemplary embodiment of the present invention.

FIG. 2A is a configuration block diagram of an apparatus for generating a concept keyword extension data-set according to an exemplary embodiment of the present invention. Hereinafter, the detailed configuration and function of the apparatus for generating a concept keyword extension data-set according to the exemplary embodiment of the present invention will be described with reference to FIG. 2A.

As shown in FIG. 2A, the apparatus 200 for generating a concept keyword extension data-set according to the exemplary embodiment of the present invention may include a main token extractor 210, a concept keyword generator 212, a concept keyword extension data-set generator 214, and a database 220.

The database 220 connected to the apparatus 200 for generating a concept keyword extension data-set is stored with a plurality of keyword groups 222a to 222n information including at least one keyword. As described above, according to the configuration of the exemplary embodiment of the present invention, the keyword groups may be a set of the grouped keywords according to the setting of the advertiser or may be a set of the classified/grouped keywords according to predetermined references (goods, goods group, and the like).

The main token extractor 210 performs a function of performing a morpheme analysis for each (advertising) keyword included in the keyword groups to extract the plurality of tokens (morphemes) and then, determining main tokens according to importance scores (importance of the corresponding tokens within the corresponding groups) for each token. Describing in more detail, the main token extractor 210 is configured to calculate the importance scores for each token extracted from the keywords within the group based on term frequency-inverse document frequency (TF-IDF). The TF-IDF, which is a weight used in the information search and the text mining, is a statistical value indicating how important any term is within a specific document when there is a document group configured of several documents. The TF (term frequency) is a value indicating how frequently the specific term appears within the document. It can be considered that the higher the value, the higher the importance of the term in the document. However, when the word itself is frequently used within the document group, this means that the term frequently appears. This is referred to as a document frequency (DF) and a reciprocal number of the value is referred to as an inverse document frequency (IDF). The TF-IDF is a value obtained by multiplying the TF by the IDF. That is, the main token extractor 210 according to the exemplary embodiment of the present invention is configured to calculate the importance of the specific tokens within the keyword groups by using the TF (the term frequency within the group) value indicating how frequently the specific tokens appear in the corresponding group and the IDF value that is the reciprocal number of the DF indicating how frequently the corresponding tokens appear in another group. In addition, the TF-IDF is only an exemplary embodiment and therefore, may adopt and use one of variously known algorithms capable of calculating weights used in the information search and text mining as needed. Despite these modifications, it is apparent to those skilled in the art that these modifications belong to the scope of the present invention as far as they include the gist of the present invention.

When the importance scores for each token are calculated, the main token extractor 210 is configured to determine the main tokens among the tokens based on the importance scores for each token according to the setting. That is, the main token extractor 210 may be configured to determine the upper three tokens as the main tokens having the high importance score among the tokens according to the setting. Alternatively, all the tokens having the importance scores of the preset score or more may be configured to be determined as the main tokens. Determining the main tokens having the high importance within the group among the tokens (morphemes) by the method are based on the statistical results that the combination of the main tokens is highly likely to configure the concept keywords. Therefore, it may divide the modifiers and the concept keywords among the keywords by determining the main tokens in the main token extractor 210.

The concept keyword generator 212 is configured to combine the main tokens extracted/determined by the main token extractor 210 to generate the concept keywords. Describing in more detail, the concept keyword generator 212 sequentially selects the main tokens from 1 to n (n: the number of main tokens) and uses the selected main token(s) to generate the concept keyword candidates. That is, the concept keyword generator 212 is configured to use all the possible combinations of n main tokens to generate the concept keyword candidates and determine the concept keywords among the generated concept keyword candidates. The concept keyword generator 212 according to the exemplary embodiment of the present invention may be configured to use various methods upon determining the concept keywords among the generated concept keyword candidates. For example, the concept keyword generator 212 may compare a hit number of each of the concept keyword candidates to determine the upper several concept keyword candidates having the high hit number as the concept keywords. In another exemplary embodiment of the present invention, the concept keyword generator 212 may be configured to determine as the concept keywords the candidates having the matched advertising keywords among the concept keyword candidates. In another exemplary embodiment of the present invention, the concept keyword generator 212 may be configured to determine the concept keyword candidates mapped to at least one keyword belonging to the keyword groups among the concept keyword candidates as the concept keyword. The concept keyword determination references may be individually used or the plurality of determination references may be configured to be combined according to the configuration of the exemplary embodiment of the present invention.

In order to perform the foregoing concept keyword determination function, the concept keyword generator 212 may be configured to determine whether the advertising keywords corresponding to each of the concept keyword candidates are present and determine the concept keyword candidates having the corresponding advertising keywords as the concept keywords. In addition, the concept keyword generator 212 may be configured to determine the concept keyword candidates having the most hit number among the plurality of contending concept keyword candidates as the concept keyword when the concept keyword candidates configured as the same main tokens are present in plural.

In this case, the concept keywords may be excessively extended and therefore, the concept keyword generator 212 may be configured to further perform the process of again choosing the concept keywords among the concept keyword candidates in which the corresponding advertising keywords are present so as to extend the meaningful concept keywords, That is, the concept keyword generator 212 according to the exemplary embodiment of the present invention may be configured to determine as the concept keywords the concept keyword candidates mapped to each keyword within the keyword groups among the concept keyword candidates in which the corresponding advertising keywords are present. The mapping between the keywords and the concept keyword candidates within the keyword groups may be performed based on jaccard coefficients. The jaccard coefficients are matching coefficients used in taxonomy, and have characteristics in that the jaccard coefficients are increased with the increase in the same characteristics, except that the jaccard coefficients do not have two kinds of entities. Therefore, the concept keyword generator 212 is configured to calculate the jaccard coefficients between each of the keywords within the group and all of the concept keyword candidates and map the corresponding keywords to the concept keyword candidates having the highest jaccard coefficients and determine the mapped concept keyword candidates as the concept keywords.

When the concept keyword candidates having the same jaccard coefficients as the specific keywords are present in plural, the concept keyword generator 212 may be configured to calculate an average value of values obtained by summing importance scores for each token of main tokens configuring the concept keyword candidates for each concept keyword candidate, map the corresponding keywords to the concept keyword candidates having an average value of the highest importance scores, and determine the concept keyword candidates as the concept keywords. When determining the concept keywords mapped by using the average value of the importance scores, it can be expected that the concept keyword candidate groups having the highest importance among the plurality of contending concept keyword candidates by reflecting the importance within the group may be determined as the concept keywords.

When the concept keywords are determined by performing the mapping process as described above, the concept keyword generator 212 may be configured to further calculate group association score between the determined concept keywords and the keyword groups. The group association scores, which is a measure indicating how much the determined specific concept keywords have representativeness (association) in connection with the corresponding group, is defined as the number of keywords within the group mapped with the corresponding concept keywords. For example, when concept keyword 1 generated/determined from keyword group 1 including 10 keywords is mapped to five keywords within the keyword group 1, concept keyword 2 is mapped to one keyword within the keyword group 1, and concept keyword 3 is mapped to four keywords within the keyword group 1, the concept keyword 1 has a group association score 5, the concept keyword 2 has a group association score 1, and the concept keyword 3 has a group association score 4. When using the group association scores for each keyword, even though the inappropriate concept keyword is determined, the keyword has the low group association scores and therefore, can be identified and managed. That is, in the foregoing example, in the case of the concept keyword 2, the keyword has the low group association score 1 and therefore, can be recognized as accidentally chosen concept keywords. According to the configuration of the present invention, the concept keyword 2 may be excluded from the concept keyword extension data-set.

When using the group association scores, the sum of the association scores of the concept keywords determined in the specific keyword groups is the same as the size of the specific keyword groups (the number of keywords included in the keyword groups) and therefore, the concept keywords extracted from the large group have a relatively larger weight (association scores) than that of the concept keywords extracted from the small group. Therefore, when using the group association scores, the central keyword extension data-set can be generated by selecting the concept keywords having the relatively high association scores.

The concept keyword extension data-set generator 214 is configured to perform a function of setting the plurality of concept keywords generated from the same keyword group as the concept keyword extension data-set by the concept keyword generator 212. In this case, the concept keyword extension data-set generator 214 may use the group association scores of the concept keywords to include or exclude the specific concept keywords in or from the concept keyword extension data-set, as described above.

In addition, the concept keyword extension data-set generator 214 according to the exemplary embodiment of the present invention may be configured to exclude the specific concept keywords from the concept keyword extension data-set or add the specific concept keywords to the concept keyword extension data-set, by using the click information of the users for the concept keywords. That is, the concept keyword extension data-set generator 214 may be configured to exclude the corresponding concept keywords from the concept keyword extension data-set when the click number of advertisements matched and exposed with the final extension keywords including the specific concept keywords for a predetermined period is a predetermined number or less and to add the corresponding concept keywords to the concept keyword extension data-set when the click number of advertisements matched and exposed with the keywords including the concept keywords that are not included in the concept keyword extension data-set for a predetermined period is the predetermined number of times or more.

The concept keyword extension data-set generator 214 according to the exemplary embodiment of the present invention may be configured to determine association among the plurality of concept keywords and set all the concept keywords having the association with each other to the concept keyword extension data-set, by using a click graph algorithm. The click graph, which is an algorithm developed to improve search quality using the click information of the search users, is an algorithm to find out good documents (the user desired document) using click patterns of the users. In the click graph, a query and a document input by the user are represented by points of the graph and the click number is represented by edges. Here, as a query-document pair is frequently clicked, the edges are represented strongly. The click graph algorithm may include a forward walk type and a backward walk type. The forward walk type is a type of finding a good quality of documents by repeating a process such as moving to frequently clicked document node, starting from a query node and finding another query frequently clicking the documents to again move to the documents. The backward walk type is a type of finding a good query by repeating arrival at the query node, starting from the document node and again arriving at a query node via a document node. The concept keyword extension data-set generator 214 according to the exemplary embodiment of the present invention may set the concept keywords and the keyword groups as nodes and sets the group association scores as edges, thereby applying the click graph algorithm. That is, the concept keyword extension data-set generator 214 may be configured to configure all the concept keywords extracted from the plurality of keyword groups as a single concept keyword extension data-set and to set other concept keywords having the association (that is, association of group→keyword→group→keyword, and the like) of the specific concept keywords as the extension data of the corresponding concept keywords.

Figure 2B:
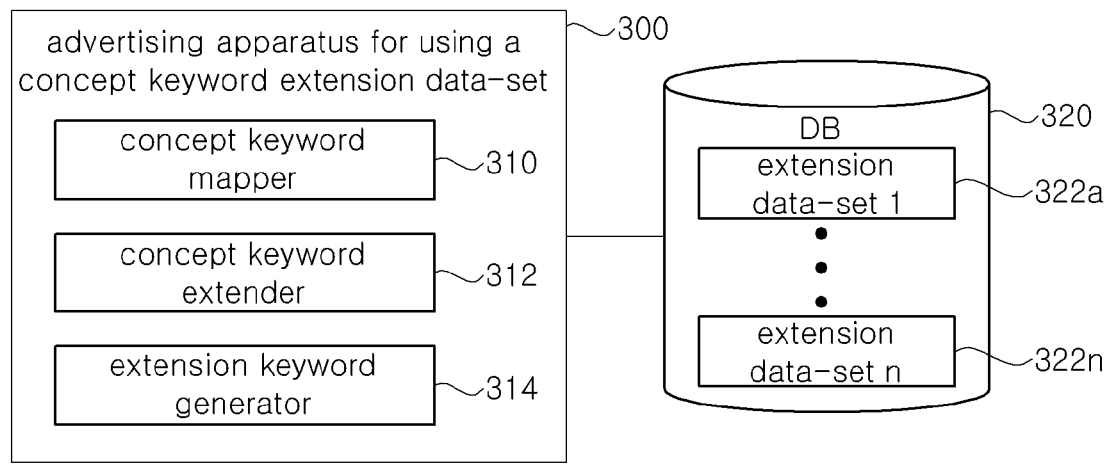
FIG. 2B is a configuration block diagram of an advertising apparatus using a concept keyword extension data-set according to an exemplary embodiment of the present invention.

FIG. 2B is a configuration block diagram of an advertising apparatus using a concept keyword extension data-set according to an exemplary embodiment of the present invention. Hereinafter, the detailed configuration and function of the advertising apparatus for using a concept keyword extension data-set according to the exemplary embodiment of the present invention will be described with reference to FIG. 2B.

As shown in FIG. 2B, the advertising apparatus 300 for using a concept keyword extension data-set according to the exemplary embodiment of the present invention may include a concept keyword mapper 310, a concept keyword extender 312, an extension keyword generator 314, and a database 320.

The database 320 connected to the advertising apparatus 300 is stored with the concept keyword extension data-sets 322a to 322n generated from the foregoing apparatus 200 for generating a concept keyword extension data-set and the advertising apparatus performs a function of using the stored extension data-set to generate the final extension keywords for the search keywords transmitted from the user terminal 120 and extracting the advertisements matched with the generated final extension keywords to be exposed to the user terminal 120.

In order to perform the above function, the concept keyword mapper 310 is configured to map the search keyword transmitted from the user terminal 120 to the specific concept keywords included in the concept keyword extension data-set. In the mapping between the search keywords and the concept keywords, the concept keyword mapper 310 performs the mapping using the jaccard coefficients as described above. That is, the concept keyword mapper 310 may be configured to calculate the jaccard coefficients for the search keywords and the concept keywords, respectively, and map the concept keywords having the highest jaccard coefficients to the search keywords. In this case, when the concept keyword having the same jaccard coefficients is present in plural, the concept keyword mapper 310 maps the corresponding search keywords to the concept keywords having the highest hit number among the plurality of contending concept keywords. The reason is that in the process of generating the foregoing concept keyword extension data-set, the importance of the concept keywords in the corresponding group in the keyword-concept keyword mapping process is important but popularity as the advertisements of the concept keywords in the search keyword-concept keyword mapping process is important.

In addition, the concept keyword mapper 310 according to the exemplary embodiment of the present invention performs a function of considering a portion that is not included in the mapped concept keywords among the search keywords as selective tokens and arbitrarily storing the selective tokens so as to be used at the time of the final extension. For example, when the search keyword '100-day celebration flower delivery' is mapped to the concept keyword 'flower delivery', the concept keyword mapper 310 stores morphemes '100-day', 'celebration' as the selective tokens so as to extend the concept keywords and then, use the extended concept keywords in the process of generating final extension keywords and outputs the stored selective tokens to the extension keyword generator. The type is to solve the modifier problem of the search keywords and determines the tokens that are not included in the mapped concept keywords among the tokens (morphemes) configuring the search keywords as the modifiers to extend the concept keywords without performing the extension of the modifiers and then, again combine the modifiers, thereby generating the final extension keywords.

When the concept keywords that may be mapped to the search keywords transmitted from the user terminal 120 are not present, the advertising apparatus according to the exemplary embodiment of the present invention processes the advertisement for the search keywords according to the general keyword advertising method.

The concept keyword extender 312 performs a function of using the concept keyword extension data-set belonging to the concept keywords mapped to the search keywords to extend the concept keywords. That is, the mapped concept keywords and the concept keywords included in the concept keyword extension data-set to which the corresponding concept keywords belong each become essential tokens at the time of generating the final extension keywords. Herein, the essential tokens mean a token that essentially includes one of the essential tokens at the time of generating the final extension keywords and the foregoing selective token means a token that may be selectively included at the time of generating the final extension keywords.

The extension keyword generator 314 performs a function of combining the essential tokens (the mapped concept keywords and the concept keywords included in the extension data-set to which the corresponding concept keywords belong) output from the concept keyword extender 312 and the selective tokens output from the concept keyword mapper 310 to generate the final extension keywords.

Here, the extension keyword generator 314 according to the exemplary embodiment of the present invention may store index information for the usable advertising keywords and may be configured to determine whether the extension keywords generated by the essential tokens or a combination of the essential tokens and the selective tokens are the usable advertising keywords with reference to the index information and the extension keyword as the final extension keywords if it is determined that the extension keywords are the usable advertising keywords.

In addition, the extension keyword generator 314 according to the exemplary embodiment of the present invention may also be configured to calculate ranking (scores) according to the predetermined references for the plurality of final extension keywords, respectively, generated during the foregoing processes, wherein the ranking for each final extension keywords may be used as various types. The references for calculating scores may be variously set as needed. For example, the search ranking may be one reference. When the extension keyword generator 314 is configured to calculate the ranking of the final extension keywords generated based on the search ranking, the extension keyword generator 314 may be configured to calculate the ranking among the final extension keywords based on the search ranking of the final extension keywords, respectively, and search the matched advertisements using only several final extension keywords (for example, using only the keywords within third place) belonging to the upper ranking among the final extension keywords generated based on the ranking according to the setting. When the type is adopted, the keywords having popularity as advertisement among the generated final extension keywords are used and therefore, efficiency and accuracy of the search advertisement may be increased. Further, according to an exemplary embodiment of the present invention, a hit (search) number may be one reference of ranking calculation. In this case, the extension keyword generator 314 may be configured to search the matched advertisements by selecting the final extension keywords having the hit number above a preset number.

Alternatively, according to the configuration of an exemplary embodiment of the present invention, the extension keyword generator 314 may also be configured to calculate the jaccard coefficients between the generated final extension keywords and the search keywords and calculate the ranking among the final extension keywords according to the calculated jaccard coefficients, that is, similarity.

Alternatively, according to the configuration of an exemplary embodiment of the present invention, the ranking of the generated final extension keywords generated based on how many the selective tokens are may be determined. That is, the selective tokens correspond to the modifiers of the search keywords input by the user and therefore, as the selective tokens increases, the selective tokens may coincide with the search intention of the user inputting the search keywords, such that the ranking among the final extension keywords may be calculated according to the number of selective tokens included in each final extension keyword. As the references for determining the ranking among the final extension keywords, in addition to the foregoing references, various references may be applied as needed. Despite the modifications, it is apparent to those skilled in the art that the references belong to the scope of the present invention as far as they include the gist of the present invention.

Figure 3:
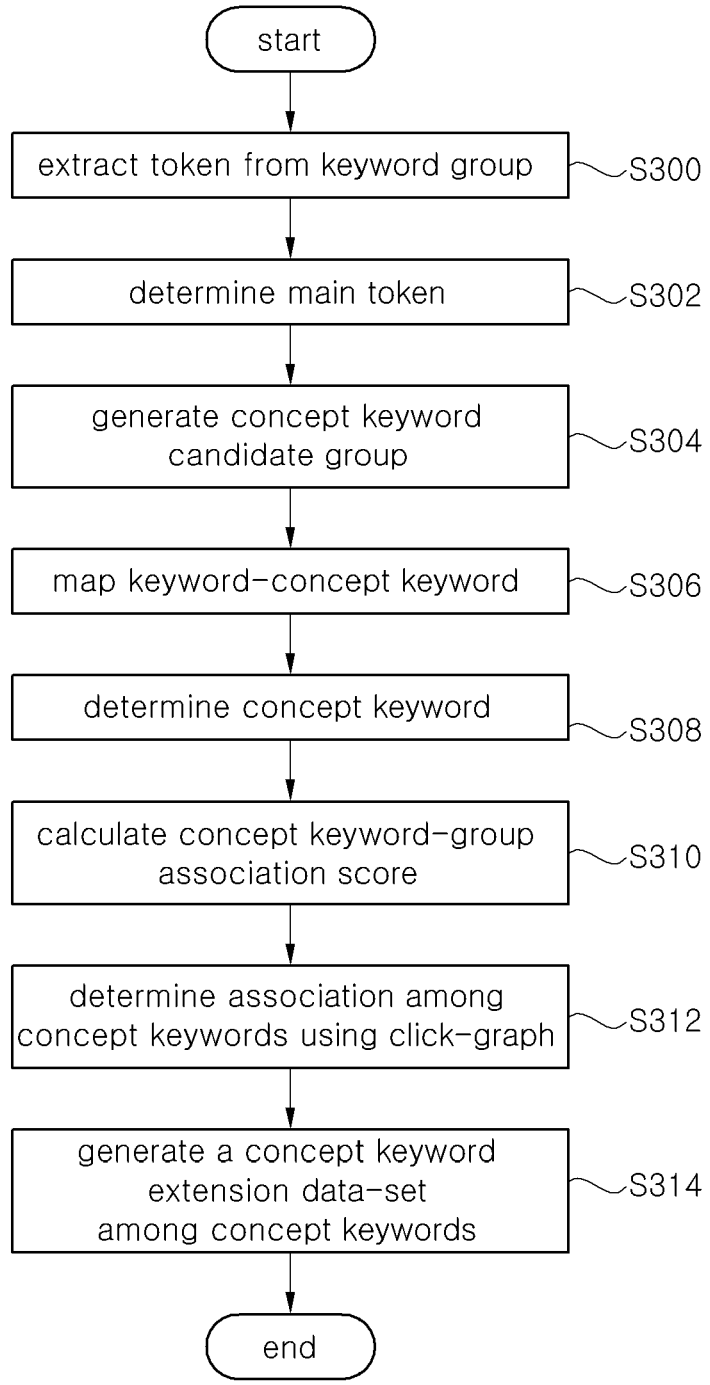
FIG. 3 is a flow chart showing a process of generating a concept keyword extension data-set performed in the apparatus for generating a concept keyword extension data-set according to the exemplary embodiment of the present invention.
Figure 4A:
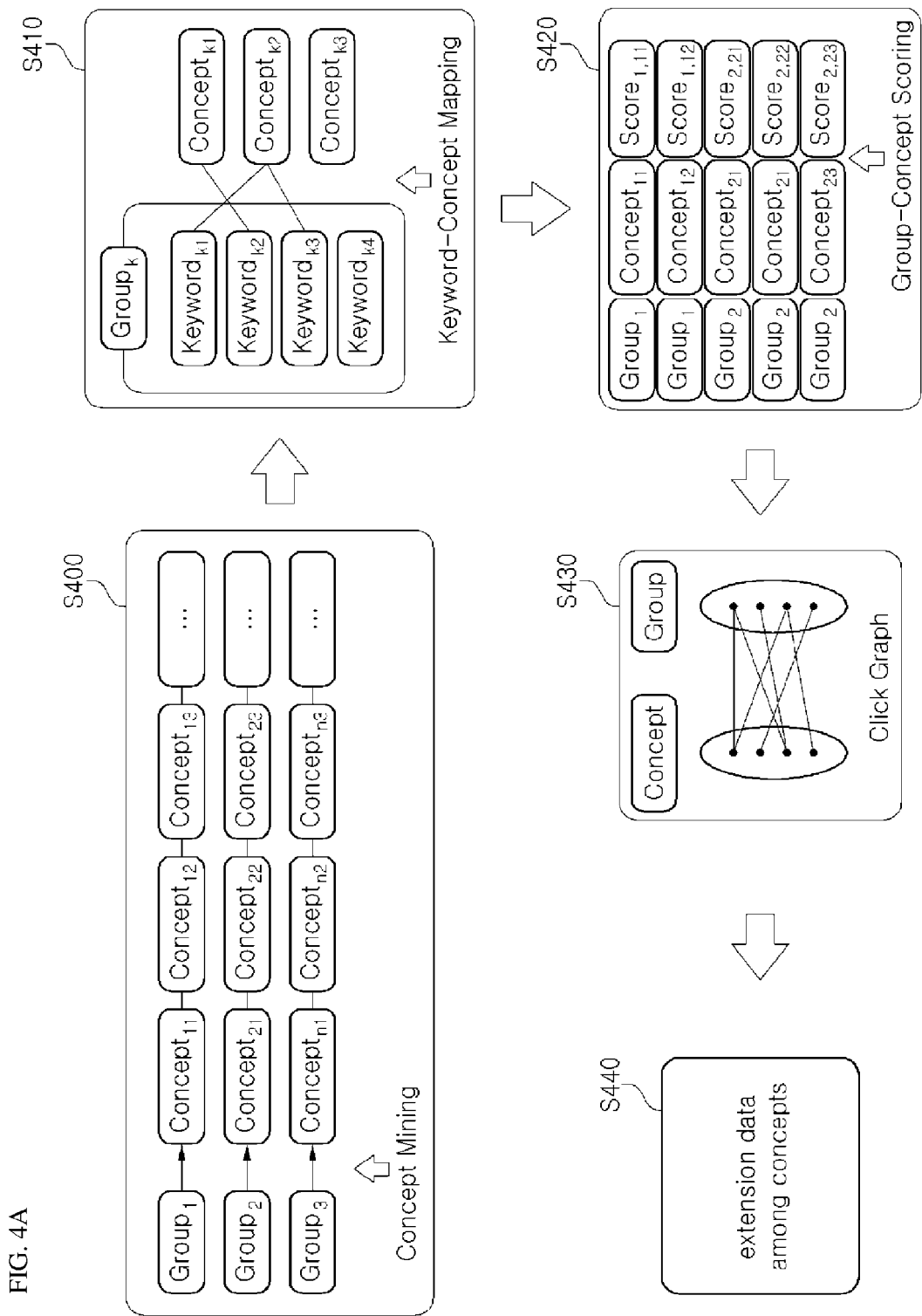
FIG. 4A is a conceptual diagram for describing the process of generating a concept keyword extension data-set according to the exemplary embodiment of the present invention.
Figure 4B:
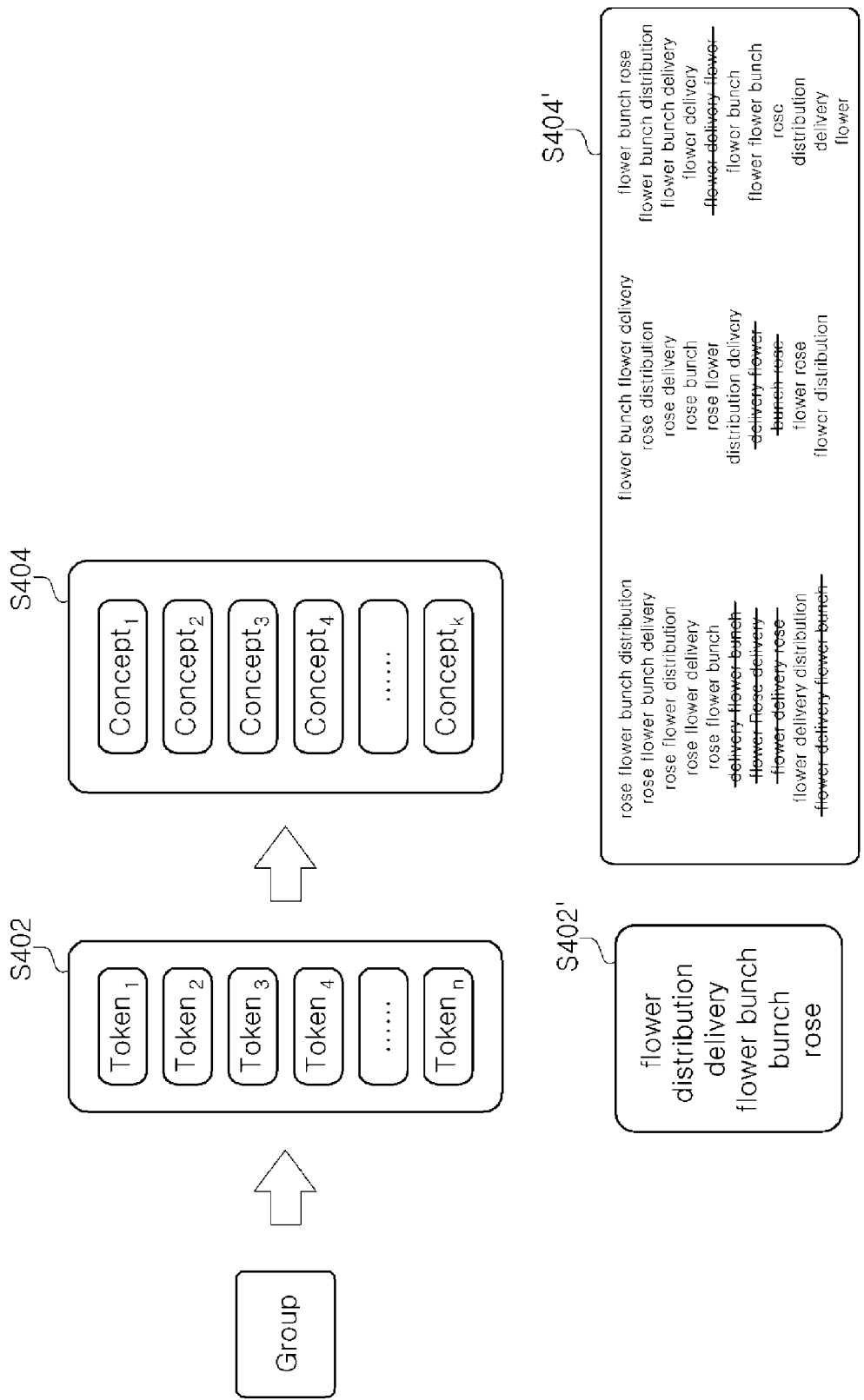
FIG. 4B is a conceptual diagram for describing a process of generating concept keyword candidate groups according to an exemplary embodiment of the present invention.
Figure 4C:
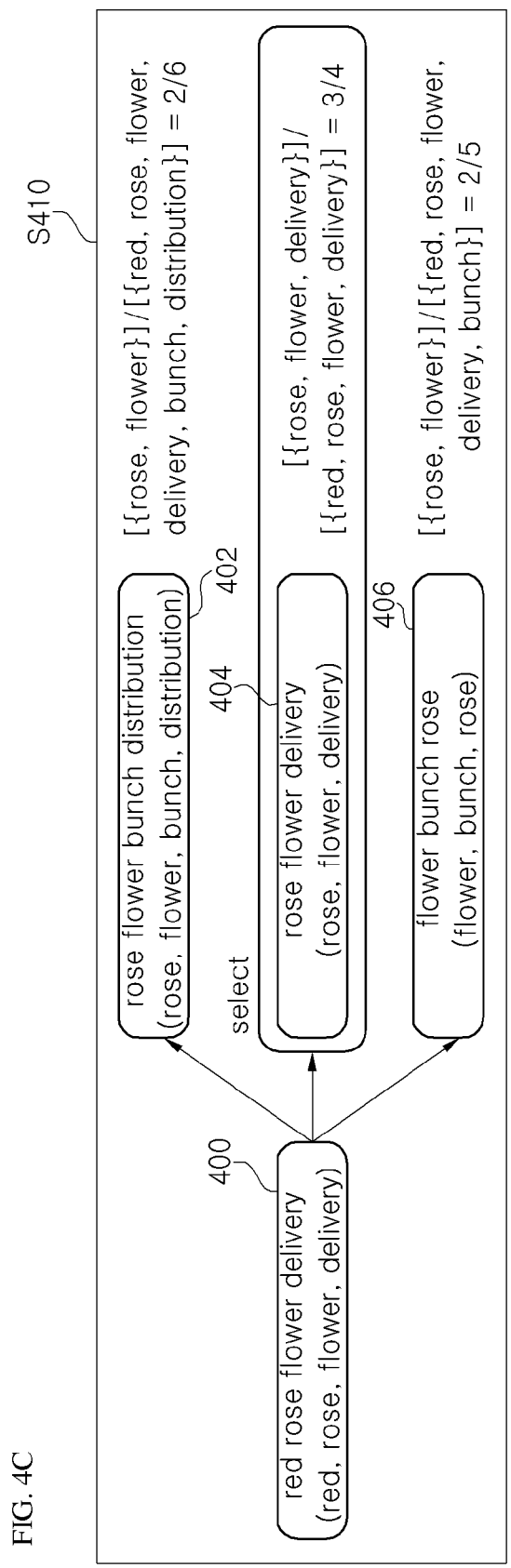
FIG. 4C is a conceptual diagram for describing a mapping process between keywords and concept keywords according to an exemplary embodiment of the present invention.

FIG. 3 is a flow chart showing a process of generating a concept keyword extension data-set performed in the apparatus for generating a concept keyword extension data-set according to an exemplary embodiment of the present invention, FIG. 4A is a conceptual diagram for describing the process of generating a concept keyword extension data-set according to an exemplary embodiment of the present invention, FIG. 4B is a conceptual diagram for describing a process of generating concept keyword candidate groups according to an exemplary embodiment of the present invention, and FIG. 4C is a conceptual diagram for describing a mapping process between keywords and concept keywords according to an exemplary embodiment of the present invention. Hereinafter, the process of generating a concept keyword extension data-set according to an exemplary embodiment of the present invention will be described in detail with reference to FIGS. 3 and 4A to 4C.

First, referring to FIG. 4A for schematic description, a method for generating a concept keyword extension data-set according to the exemplary embodiment of the present invention largely includes a concept mining step of generating the concept keyword candidate groups from each of the keyword groups (S400), a keyword-concept mapping step of mapping each of the keywords included in the keyword groups to one of the concept keyword candidates generated in the concept mining step to determine the concept keywords (S410), a group-concept scoring step of calculating the group association scores of each of the concept keywords determined in the keyword-concept mapping step (S420), a click graph applying step of setting the concept keywords and the keyword groups, respectively, as the nodes and setting the group association scores as the edges to apply the click graph algorithm (S430), and a step of generating the extension data-set between the concept keywords based on the association of the concept keywords determined in the click graph applying step (S440), thereby generating the extension data-set.

For more detailed description, referring to FIG. 3, the apparatus 200 for generating a concept keyword extension data-set extracts the tokens (morphemes) by analyzing the morphemes for the keywords of the stored keyword group (S300). After the tokens are extracted, the apparatus 200 calculates the importance scores for each extracted token based on the TF-IDF and determines the main tokens based on the importance scores for each calculated token (S302). Referring to the exemplary embodiment of the present invention shown in FIG. 4B, it can be confirmed in S402 that the main tokens 'flower', 'distribution', 'delivery', 'flower bunch', 'bunch', and 'rose' may be extracted/determined.

When the main tokens are determined, the apparatus 200 combines the main tokens to generate the concept keyword candidate groups (S304). Referring to FIG. 4B, the concept keyword candidate groups generated using 1 to n main tokens extracted/determined in S402 is shown in S404 In this case, all the combined and generated concept keyword candidates are not included in the concept keyword candidate groups and the concept keyword candidates in which the corresponding advertising keywords are present may be configured to be included in the concept keyword candidate groups. That is, the concept keyword candidates that are not used as the substantial advertising keywords are meaningless and may be configured to be excluded in the process of generating the concept keyword candidate groups. In S404 of FIG. 4B, 'flower bunch flower', 'delivery flower bundle', 'flower rose delivery', 'delivery flower', 'flower delivery rose', 'bunch rose', 'flower delivery flower bunch' are not used as the substantial advertising keywords and therefore, are excluded from the concept keyword candidate groups.

When the generation of the concept keyword candidate groups is completed, the apparatus 200 maps each keyword within the keyword group to one of the concept keyword candidate groups (S306). As described above, the mapping is performed using the jaccard coefficients between the keywords and the concept keywords candidates. Referring to FIG. 4C, the keyword 'red rose flower delivery' (400) included in the keyword groups are configured of tokens 'red', 'rose', 'flower', and 'delivery', the concept keyword candidates 'rose flower bunch delivery' (402) is configured of tokens 'rose', 'flower', 'bunch', and 'delivery', the 'rose flower delivery' 404 is configured of tokens 'rose', 'flower', and 'delivery', and the 'flower bunch rose' 406 is configured of tokens 'flower', 'bunch', and 'rose'. When the jaccard coefficients of each concept keyword candidates for the keyword 'red rose flower delivery' 400 are calculated based on the tokens, the 'rose flower bunch delivery' 402 has a jaccard coefficient of 2/6, the 'rose flower delivery' 404 has a jaccard coefficient of ¾, and the 'flower bunch rose' 406 has a jaccard coefficient of ⅖ and therefore, the keyword 'red rose flower delivery' 400 is mapped to the concept keyword candidates referred to as the 'rose flower delivery' 404. The apparatus 200 determines the concept keyword candidates mapped to the keywords within the keyword groups as the concept keywords (S308).

When the plurality of keyword groups are stored/set, the foregoing processes may be separately performed on each keyword group to generate/determine the concept keywords for each keyword group.

When the concept keywords for the keyword groups are determined, the apparatus 200 uses the number of keywords belonging to the keyword groups mapped to the concept keywords for each concept keyword to calculate the group association scores for each concept keyword (S310).

When the group association scores for each concept keyword are calculated, the apparatus 200 sets the concept keywords and the keyword groups as each node and sets the group association scores as the edges to apply the click graph algorithm, thereby determining the association among each concept keyword (S312).

When the association among the concept keywords is determined, the apparatus 200 sets the main keywords having the association with each other as the single concept keyword extension data-set, such that the process ends (S314).

Figure 5:
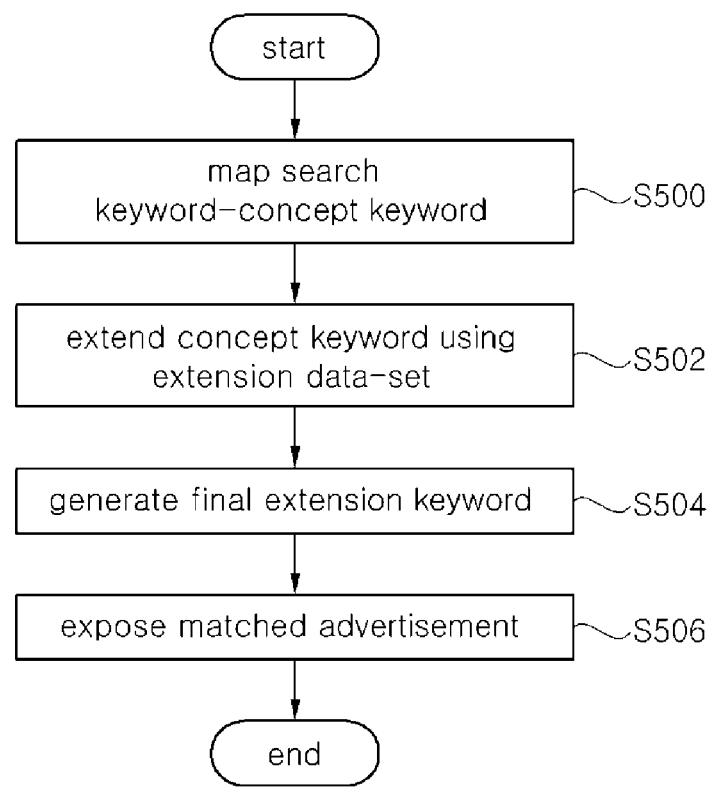
FIG. 5 is a flow chart showing a process of exposing advertisement performed in the advertising apparatus using the concept keyword extension data-set according to the exemplary embodiment of the present invention.
Figure 6:
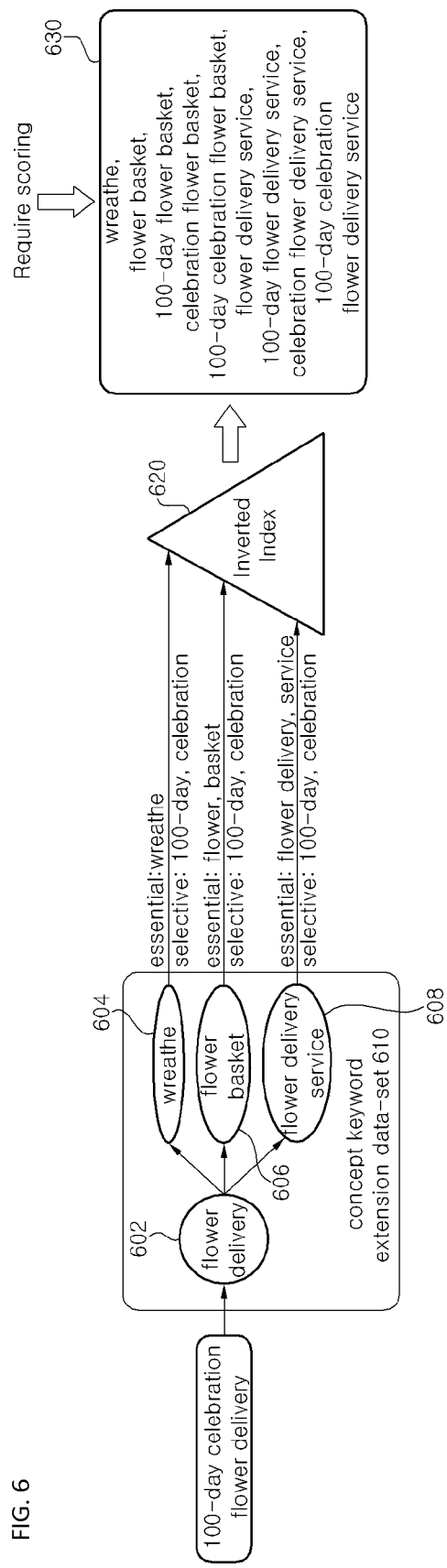
FIG. 6 is a conceptual diagram for describing a process of extending final keywords using a concept keyword extension data-set according to an exemplary embodiment of the present invention.

FIG. 5 is a flow chart showing a process of exposing advertisement performed in the advertising apparatus using the concept keyword extension data-set according to an exemplary embodiment of the present invention and FIG. 6 is a conceptual diagram for describing a process of extending final keywords using a concept keyword extension data-set according to an exemplary embodiment of the present invention. Hereinafter, the advertising method for using a concept keyword extension data-set according to an exemplary embodiment of the present invention will be described with reference to FIGS. 5 and 6.

Referring to FIG. 5, the advertising apparatus 300 receives the search keywords transmitted from the user terminal 120 and maps the received search keywords to one of the concept keywords included in the extension data-set (S500). As described above, the mapping may be configured to calculate the jaccard coefficients between the search keywords and the concept keywords and map the search keywords to the concept keywords having the highest jaccard coefficient. In addition, the advertising apparatus 300 stores the tokens that are not included in the mapped concept keywords among the tokens of the search keywords as the selective tokens, while performing the mapping. Referring to FIG. 6, '100-day celebration flower delivery' 600 is mapped to the concept keywords referred to as 'flower delivery' 602 and the tokens '100-day' and 'celebration' of the search keywords that are not included in the concept keyword 'flower delivery' 602 are stored as the selective tokens.

When the mapping between the search keywords and the concept keywords is completed, the advertising apparatus 300 uses the concept keyword extension data-set 610 to extend the mapped concept keywords (S502). Referring to FIG. 6, the concept keyword 'flower delivery' 602 is extended to the concept keywords 'wreathe' 604, 'flower basket' 606, and 'flower delivery service' 608. In this case, the extended concept keywords are stored as the essential tokens.

When the extension of the concept keywords is completed, the advertising apparatus 300 uses the essential tokens and the selective tokens to generate the final extension keywords (S504). As described above, the essential tokens mean tokens in which one of the essential tokens are necessarily included in the final extension keywords and the selective tokens mean tokens that may be selectively included in the final extension keywords. Referring to FIG. 6, the concept keyword 'flower delivery' 602 is extended to the concept keywords 'wreathe' 604, 'flower basket' 606, and 'flower delivery service' 608 and therefore, the essential tokens become the 'wreathe' 604, the 'flower basket' 606, and the 'flower delivery service' 608. In addition, as described above, the selective tokens are '100-day' and 'celebration' and therefore, the advertising apparatus 300 uses the essential tokens and the selective tokens to generate the final extension keywords. In this case, according to an exemplary embodiment of the present invention, the advertising apparatus 300 may store index information 620 for the usable advertising keywords and may be configured to determine whether the extension keywords generated by the essential tokens or a combination of the essential tokens and the selective tokens are the usable advertising keywords with reference to the index information and the extension keywords as the final extension keywords if it is determined that the extension keywords are the usable advertising keywords. In the exemplary embodiment of the present invention shown in FIG. 6, all the possible extension keywords using the essential tokens and the selective tokens are 'wreathe', '100-day wreathe', 'celebration wreathe', '100-day celebration wreathe', 'flower basket', '100-day flower basket', 'celebration flower basket', '100-day celebration flower basket', 'flower delivery service', '100-day flower delivery service', 'celebration flower delivery service', and '100-day celebration flower delivery service'. However, '100-day wreathe', 'celebration wreathe' and '100-day celebration wreathe' correspond to the advertising keywords that should not be used and are excluded from a set of final extension keywords (630).

When the set of the final extension keywords are generated, the advertising apparatus 300 uses the final extension keywords included in the set of the final extension keywords to search the matched advertisements and exposes the searched advertisements to the user terminal 120 (S506).

The exemplary embodiments according to the present invention are implemented in a form of program commands capable of being performed through various computer components to thereby be recordable in a computer-readable recording medium. The computer readable medium may include program instructions, data files, data structure, or the like, alone or a combination thereof. The program command recorded in the computer-readable recording medium may be designed and constituted especially for the present invention, or may be known to those skilled in a field of computer software. Examples of the computer-readable recording medium may include a magnetic medium such as a hard disk, a floppy disk, and a magnetic tape, an optical recording medium such as a CD-ROM, a DVD, a magneto-optical medium such as an optical disk, and a hardware device specially constituted to store and perform program commands such as a ROM, a RAM, a flash memory, or the like. Examples of the program commands may include machine language codes such as being made by compilers as well as high-level language codes capable of being executed by computers using interpreters, or the like. The hardware device may be constituted to be operated as one more software modules in order to perform the action according to the present invention, and vice versa.

Hereinabove, although the present invention is described by specific matters such as concrete components, and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments and the following claims as well as all modified equally or equivalently to the claims are intended to fall within the scopes and spirits of the invention.

What is claimed is:

1. A method for a search using a processor and a concept keyword extension data-set, the method comprising:
    mapping a received search keyword to a concept keyword;
    extending, using the processor, the concept keyword to a plurality of extended concept keywords having association with each other using the concept keyword extension data-set which comprises the concept keyword, wherein the concept keyword extension data-set includes at least one extended concept keyword that is different from the concept keyword; and
    generating extension keywords corresponding to the extended concept keywords,
    wherein the mapping further comprises performing morpheme analysis on the received search keyword and determining modifiers, wherein the determined modifiers are morphemes not included in the concept keyword, from among morphemes included in the received search keyword,
    wherein the generating extension keywords further comprises setting the plurality of extended concept keywords as essential tokens and the modifiers as selective tokens, and generating the extension keywords by combining the essential tokens and the modifiers such that at least one of the extension keywords is a combination of words that include both one of the essential tokens and one of the selective tokens, and wherein each of the generated extension keywords includes one, and only one, essential token, and
    wherein the concept keyword indicates a good or a service.

2. The method of claim 1, wherein the mapping further comprises calculating jaccard coefficients between each of keywords and the received search keyword, and mapping the received search keyword to a keyword having the highest jaccard coefficient as the concept keyword.

3. The method of claim 2, wherein the received search keyword is mapped to a concept keyword having the highest hit number based on a hit number of each concept keyword when concept keywords having the highest jaccard coefficients are present in plural.

4. The method of claim 1, wherein the generating extension keywords comprises:
    selecting one of the essential tokens;
    generating extension keyword candidates using the selected essential token; and
    repeating the selecting and the generating until all essential tokens corresponding to the plurality of extended concept keywords are selected.

5. The method of claim 4, wherein the generating of the extension keywords further comprises:
    determining whether the generated extension keyword candidates are usable keywords with reference to index information including information on usable keywords and determining the usable extension keyword candidates as the extension keywords.

6. The method of claim 5, wherein the generating of the extension keywords further comprises:
    determining ranking between the extension keywords according to predetermined references.

7. The method of claim 6, wherein the determining of the ranking between the extension keywords is determined based on the hit number of each of the extension keywords.

8. The method of claim 6, wherein the determining of the ranking between the extension keywords further comprises calculating the jaccard coefficients between each of the extension keywords and the search keyword, and determining the ranking between the extension keywords based on the calculated jaccard coefficients for each of the extension keywords.

9. The method of claim 6, wherein the generating of the extension keywords further comprises selecting a predetermined number of extension keywords based on the ranking between the extension keywords and performing a search using the selected extension keywords and then outputting search results.

10. A non-transitory computer readable medium comprising an executable program which, when executed, performs a method for a search using a concept keyword extension data-set, the method comprising:
    mapping a received search keyword to a concept keyword;
    extending, using the processor, the concept keyword to a plurality of extended concept keywords having association with each other using the concept keyword extension data-set which comprises the concept keyword, wherein the concept keyword extension data-set includes at least one extended concept keyword that is different from the concept keyword; and generating extension keywords corresponding to the extended concept keywords, wherein the mapping further comprises performing morpheme analysis on the received search keyword and determining modifiers, wherein the determined modifiers are morphemes not included in the concept keyword, from among morphemes included in the received search keyword, and wherein each of the generated extension keywords includes one, and only one, essential token, wherein the generating extension keywords further comprises setting the plurality of extended concept keywords as essential tokens and the modifiers as selective tokens, and generating the extension keywords by combining the essential tokens and the modifiers such that at least one of the extension keywords is a combination of words that includes both one of the essential tokens and one of the selective tokens, and wherein the concept keyword indicates a good or a service.

11. An apparatus for a search using a concept keyword extension data-set, comprising:

at least one processor configured to communicate with at least one non-transitory storage medium, the at least one non-transitory storage medium comprising:

a concept-keyword mapper configured to map a received search keyword to a concept keyword;

a concept keyword extender configured to extend the concept keyword to a plurality of extended concept keywords having association with each other using the concept keyword extension data-set comprising the concept keyword, wherein the concept keyword extension dataset includes at least one extended concept keyword that is different from the concept keyword; and an extension keyword generator configured to generate extension keywords corresponding to the extended concept keywords, wherein the concept keyword mapper is configured to map the received search keyword to the concept keyword included in the concept keyword extension data-set, perform morpheme analysis on the received search keyword, and determine modifiers, wherein the determined modifiers are morphemes not included in the concept keyword, from among morphemes included in the received search keyword, and wherein each of the generated extension keywords includes one, and only one, essential token, wherein the extension keyword generator is further configured to combine the essential tokens and the selective tokens to generate extension keywords after the plurality of concept keywords are set as essential tokens and the modifiers are set as selective tokens, such that at least one of the extension keywords is a combination of words that includes both one of the essential tokes and one of the selective tokens, and wherein the concept keyword indicates a good or a service.

12. The apparatus of claim 11, wherein the concept keyword mapper is configured to calculate jaccard coefficients between each of keywords and the received search keyword, and map the received search keywords to a keyword having the highest jaccard coefficients as the concept keyword.

13. The apparatus of claim 11, wherein the extension keyword generator is configured to select one of the essential tokens, generate extension keyword candidates using the selected essential tokens, and repeat the selecting and the generating until all essential tokens corresponding to the plurality of extended concept keywords are selected.

14. The apparatus of claim 13, wherein the extension keyword generator is configured to determine whether the generated extension keyword candidates are usable keywords with reference to index information including information on usable keywords and determine the usable extension keyword candidates as extension keywords.

15. The apparatus of claim 14, wherein the extension keyword generator is further configured to determine ranking between the determined extension keywords according to predetermined references.

16. The apparatus of claim 15, wherein the extension keyword generator is configured to select a predetermined number of extension keywords based on the ranking between the extension keywords, perform a search using the selected extension keywords, and output search results.

* * * * *